United States Patent
Harik et al.

(10) Patent No.: US 7,657,423 B1
(45) Date of Patent: Feb. 2, 2010

(54) AUTOMATIC COMPLETION OF FRAGMENTS OF TEXT

(75) Inventors: Georges R. Harik, Mountain View, CA (US); Simon Tong, Mountain View, CA (US); David R. Cheng, Avondale, PA (US)

(73) Assignee: Google Inc., Mountain View, CA (US)

( * ) Notice: Subject to any disclaimer, the term of this patent is extended or adjusted under 35 U.S.C. 154(b) by 1190 days.

(21) Appl. No.: 10/697,333

(22) Filed: Oct. 31, 2003

(51) Int. Cl.
*G06F 17/27* (2006.01)

(52) U.S. Cl. .................. 704/9; 704/1; 704/10; 707/2; 707/3; 707/4; 707/5; 707/6; 715/261

(58) Field of Classification Search .................. 704/1, 704/9, 10; 707/1–6; 715/534, 261, 816
See application file for complete search history.

(56) References Cited

U.S. PATENT DOCUMENTS

| | | | | |
|---|---|---|---|---|
| 4,994,966 A * | 2/1991 | Hutchins | ........................ | 704/9 |
| 5,369,577 A * | 11/1994 | Kadashevich et al. | ........... | 704/9 |
| 5,519,608 A * | 5/1996 | Kupiec | ............................ | 704/9 |
| 5,678,053 A * | 10/1997 | Anderson | ........................ | 704/1 |
| 5,757,983 A * | 5/1998 | Kawaguchi et al. | .......... | 382/305 |
| 5,885,083 A * | 3/1999 | Ferrell | ......................... | 434/156 |
| 5,896,321 A * | 4/1999 | Miller et al. | ........... | 365/189.15 |
| 5,952,942 A * | 9/1999 | Balakrishnan et al. | ........ | 341/20 |
| 5,953,541 A * | 9/1999 | King et al. | ..................... | 710/67 |
| 5,956,739 A * | 9/1999 | Golding et al. | ............. | 715/209 |
| 6,173,253 B1 * | 1/2001 | Abe et al. | ...................... | 704/10 |
| 6,173,261 B1 * | 1/2001 | Arai et al. | .................... | 704/257 |
| 6,374,242 B1 * | 4/2002 | Childs et al. | .................... | 707/6 |
| 6,377,945 B1 * | 4/2002 | Risvik | ............................ | 707/3 |
| 6,564,213 B1 * | 5/2003 | Ortega et al. | .................... | 707/5 |
| 6,584,470 B2 * | 6/2003 | Veale | ............................. | 707/3 |
| 6,618,697 B1 * | 9/2003 | Kantrowitz et al. | ........... | 703/22 |
| 6,775,677 B1 * | 8/2004 | Ando et al. | .................. | 707/102 |
| 6,820,075 B2 * | 11/2004 | Shanahan et al. | .............. | 707/3 |
| 6,957,213 B1 * | 10/2005 | Yuret | .............................. | 707/4 |
| 6,963,869 B2 * | 11/2005 | Burrows | ......................... | 707/4 |
| 7,027,975 B1 * | 4/2006 | Pazandak et al. | ............... | 704/9 |
| 7,149,550 B2 * | 12/2006 | Kraft et al. | .................. | 455/566 |
| 7,200,592 B2 * | 4/2007 | Goodwin et al. | ............... | 707/6 |
| 7,376,641 B2 * | 5/2008 | Chang et al. | .................... | 707/3 |
| 2001/0004737 A1 * | 6/2001 | Laux | ............................. | 707/1 |
| 2002/0174101 A1 * | 11/2002 | Fernley et al. | .................. | 707/1 |
| 2003/0023426 A1 * | 1/2003 | Pun et al. | ........................ | 704/9 |
| 2003/0232312 A1 * | 12/2003 | Newsom et al. | ............. | 434/157 |
| 2004/0078366 A1 * | 4/2004 | Crooks et al. | .................. | 707/3 |

(Continued)

OTHER PUBLICATIONS

"Googlism"; http://www.googlism.com/about.htm; Oct. 9, 2003 (print date); 1 page.

(Continued)

*Primary Examiner*—David R Hudspeth
*Assistant Examiner*—Lamont M Spooner
(74) *Attorney, Agent, or Firm*—Harrity & Harrity, LLP (57) ABSTRACT

A system offers potential completions for fragments of text. The system may obtain a text fragment and identify documents that include the text fragment. The system may locate sentences within the documents that include at least a portion of the text fragment, identify sentence endings associated with the located sentences, and present the sentence endings as potential completions for the text fragment.

30 Claims, 5 Drawing Sheets

U.S. PATENT DOCUMENTS

| | | | | |
|---|---|---|---|---|
| 2004/0117352 A1* | 6/2004 | Schabes et al. | | 707/3 |
| 2004/0153975 A1* | 8/2004 | Williams et al. | | 715/531 |
| 2004/0183833 A1* | 9/2004 | Chua | | 345/773 |
| 2004/0225647 A1* | 11/2004 | Connelly et al. | | 707/3 |
| 2005/0223308 A1* | 10/2005 | Gunn et al. | | 715/500 |
| 2007/0150469 A1* | 6/2007 | Simonyi | | 707/6 |

OTHER PUBLICATIONS

"Microsoft Word AutoComplete & Auto Text Features"; http://computing.fandm.edu/training/wordx/autotext.php; Oct. 9, 2003; pp. 1-5.

"Emacs Text Editor"; http://www.mrs.umn.edu/cs/unix/emacs.html; Apr. 5, 2002; pp. 1-6.

* cited by examiner

AUTOMATIC COMPLETION OF FRAGMENTS OF TEXT

BACKGROUND OF THE INVENTION

1. Field of the Invention

The present invention relates generally to information retrieval systems and, more particularly, to systems and methods for automatically completing fragments of text (e.g., sentences or paragraphs).

2. Description of Related Art

Oftentimes, people have trouble completing sentences and/or paragraphs. They know what they want to say but they cannot find the appropriate words to say it. These people may find it beneficial to be offered possible completions for sentences and/or paragraphs.

Accordingly, there exists a need for mechanisms that provide possible completions for fragments of text, such as partial sentences and/or paragraphs.

SUMMARY OF THE INVENTION

Systems and methods, consistent with the principles of the invention, automatically complete fragments of text, such as sentences or paragraphs.

According to one aspect consistent with the principles of the invention, a method for completing fragments of text is provided. The method may include obtaining a text fragment and performing a search, based at least in part on the text fragment, to identify one or more documents. The method may also include identifying sentences within the one or more documents that are associated with the text fragment, determining sentence endings associated with the identified sentences, and presenting the sentence endings as potential completions for the text fragment.

According to another aspect, a computer device includes a memory configured to store code and a processor configured to execute the code in the memory. The code in the memory may include document preparation code and assistant code. The document preparation code is configured to permit a user to prepare or edit a document. The assistant code is configured to detect a fragment of text within the document, obtain potential sentence completions for the fragment of text, and present the potential sentence completions to the user.

According to a further aspect, a computer device includes a memory configured to store instructions and a processor configured to execute the instructions in the memory. The processor may obtain a fragment of text and search for local documents that include at least a portion of the fragment of text. The processor may identify sentences within the local documents that are associated with the fragment of text, determine sentence completions associated with the located sentences, and provide the sentence completions as potential completions for the fragment of text.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may automatically complete a fragment of text, such as a sentence or paragraph. The systems and methods may identify possible endings from documents, such as web documents, and provide these endings as possible completions for the fragment of text.

Exemplary Network Configuration

Figure 1:
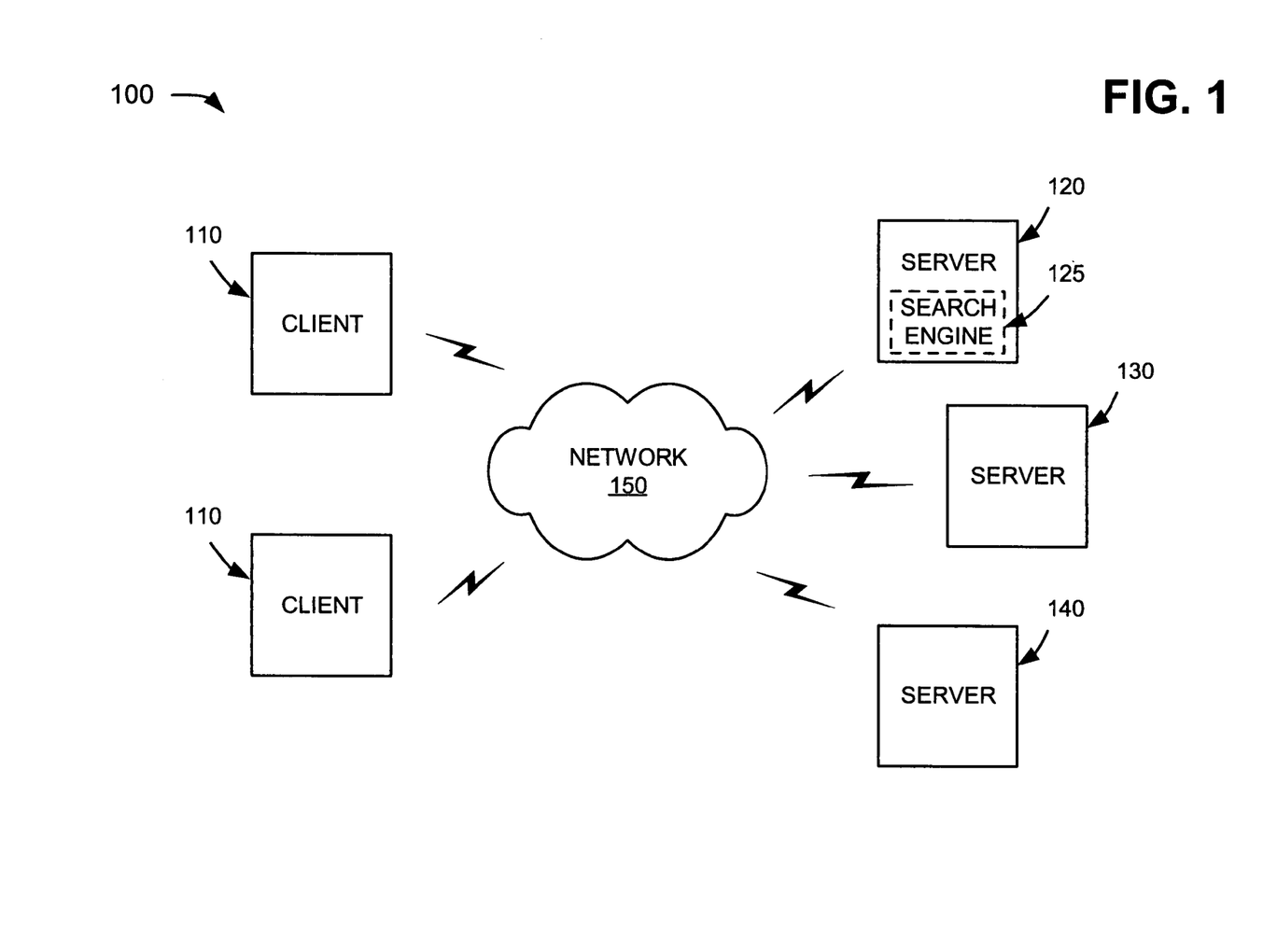
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may optionally include a search engine 125 usable by clients 110. Server 120 may crawl a corpus of documents (e.g., web pages) and store information associated with these documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Exemplary Client/Server Architecture

Figure 2:
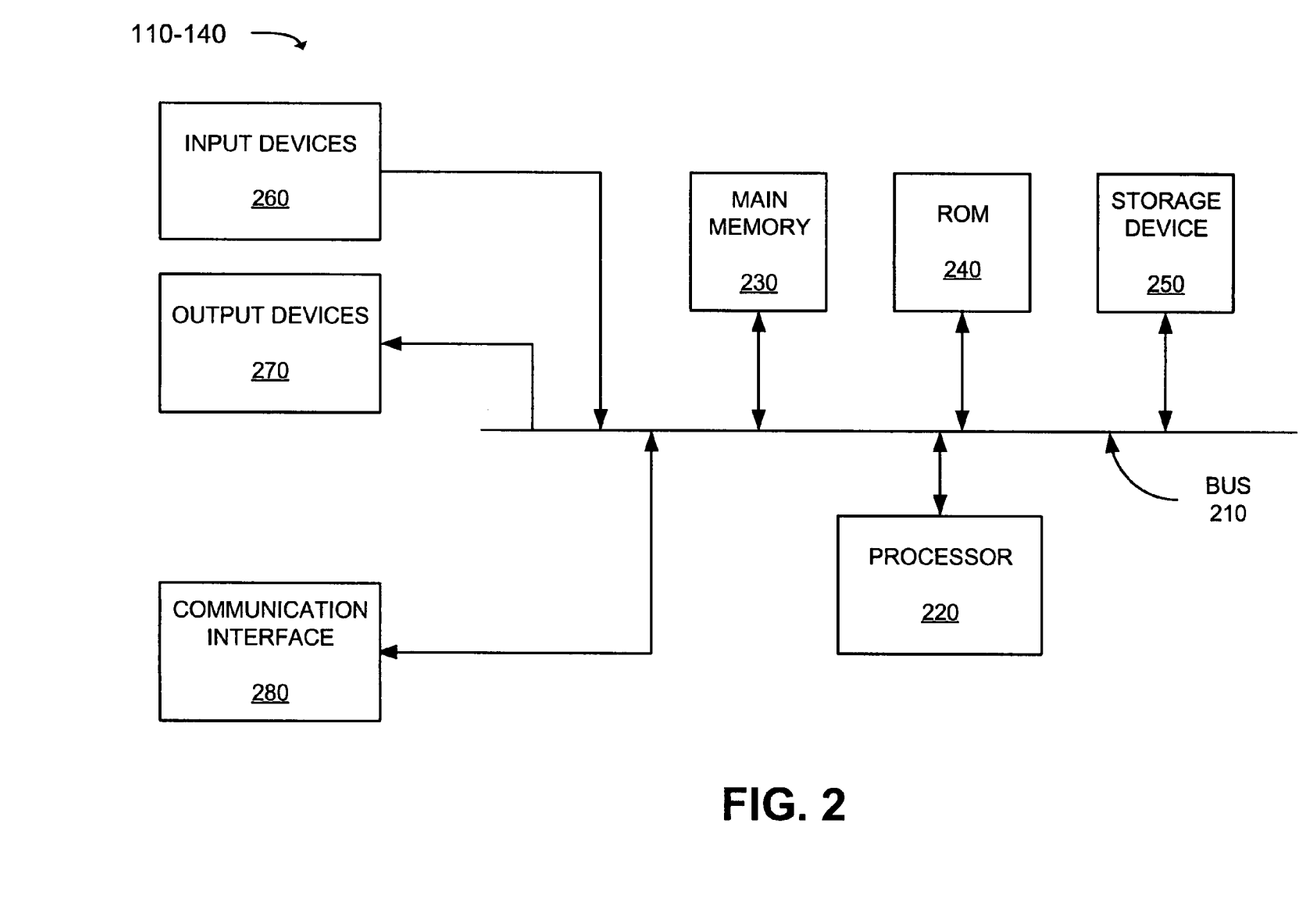
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3A:
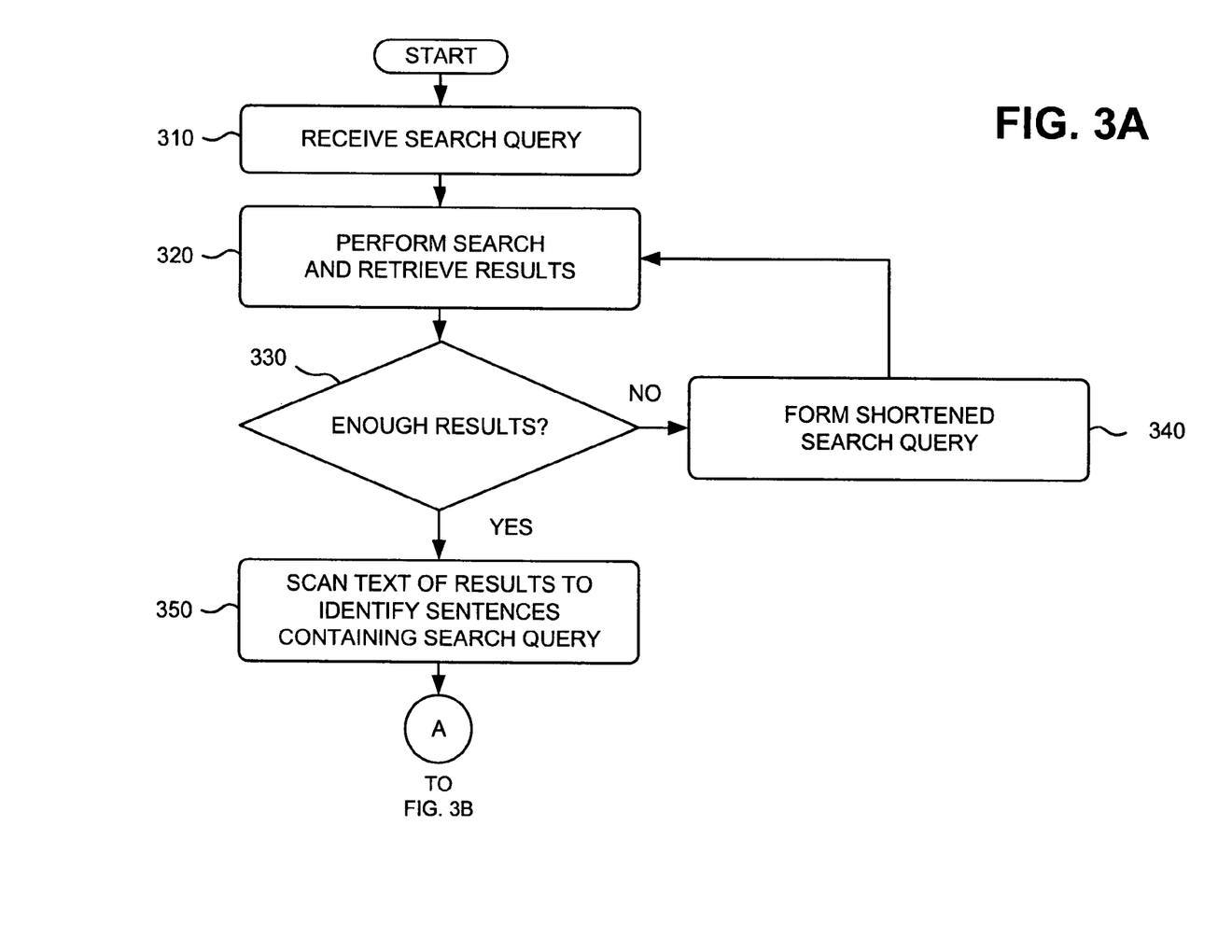
FIGS. 3A and 3B are flowcharts of exemplary processing for automatically completing a fragment of text according to an implementation consistent with the principles of the invention.

FIGS. 3A and 3B are flowcharts of exemplary processing for automatically completing fragments of text, such as sentences and paragraphs, according to an implementation consistent with the principles of the invention. Processing may begin with server 120 receiving a search query from a user (act 310) (FIG. 3A). For example, a user may use conventional web browser software on client 110 to access search engine 125 of server 120. The user may then enter the search query via a graphical user interface provided by server 120.

The search query may take different forms, such as a fragment of text. The text fragment may be associated with a partial sentence, such as "Jane, I have to go because." Alternatively, the text fragment may be associated with a partial paragraph, such as "Now we are engaged in a great civil war, testing whether that nation, or any nation so conceived, and so dedicated, can long endure. We are met on a great battle field of that war." While the description to follow will be described mainly in terms of completing sentences, the description is equally applicable to completing paragraphs.

Server 120 may perform a search for documents that contain the search query and retrieve the search results (act 320). For example, server 120 may search a corpus or repository of documents to identify documents that include the text fragment of the search query as a phrase. In another implementation, server 120 may search for documents that also include synonyms of the word(s) in the search query. In either case, the documents may include documents stored by one or more servers, such as servers 120-140. Server 120 may optionally cap the number of documents included in the search results (e.g., server 120 may retrieve the top 100 documents). For each of these documents, server 120 may retrieve its title and text.

Server 120 may then determine whether there are sufficient search results (act 330). For example, server 120 may compare the number of search results retrieved with a threshold (e.g., five). When the number of search results is less than the threshold, the search results may not be adequate to satisfy the search query provided by the user. In this case, server 120 may form a shortened search query (act 340). For example, server 120 may drop one or more words from the search query.

Several techniques exist for determining what word(s) to drop. For example according to one implementation, server 120 may simply drop one or more words from the beginning or end of the search query. According to another implementation, server 120 may drop one or more words based on one or more symbols, such as a comma, semicolon, bracket, backslash, etc., contained in the search query. For example, if the search query includes a comma, then server 120 may drop everything before or after the comma. Server 120 may perform similar functions based on other symbols. According to yet another implementation, server 120 may analyze the structure of the search query to more intelligently drop one or more words. For example, server 120 may use a parse tree to identify parts of the search query. Server 120 may then drop one or more of these parts. In the sentence example provided above, server 120 may shorten the search query to "I have to go because," dropping "Jane," from the search query.

Server 120 may then perform a search for documents that contain the shortened search query and retrieve the search results (act 320). As described above, server 120 may search a corpus or repository of documents to identify documents that include the shortened search query as a phrase. Server 120 may then again determine whether there are sufficient search results (act 330).

When there are sufficient search results (e.g., the number of search results is greater than or equal to the threshold), server 120 may scan the text of the documents in the search results to identify sentences that contain the search query (act 350). Server 120 may optionally locate periods within the documents to identify candidate sentences and then identify which of the candidate sentences include the search query. The search query may be included at the beginning or elsewhere within the identified sentences. Server 120 may give preference to a sentence that includes the search query at the beginning of the sentence over sentences where the search query occurs elsewhere. Server 120 may optionally discard sentences where the search query occurs more than once within the same sentences.

For each occurrence of the search query, server 120 may search left and right to determine the rough boundaries of the sentence containing the search query. For example, server 120 may look for periods (or other forms of punctuation) that typically precede and end a sentence. Server 120 may be programmed to ignore other typical occurrences of periods (and other forms of punctuation), such as when periods are used for initials, abbreviations, etc. Server 120 may optionally discard sentences that are missing punctuation and sentences that do not make sense (e.g., do not contain proper sentence structure).

Figure 3B:
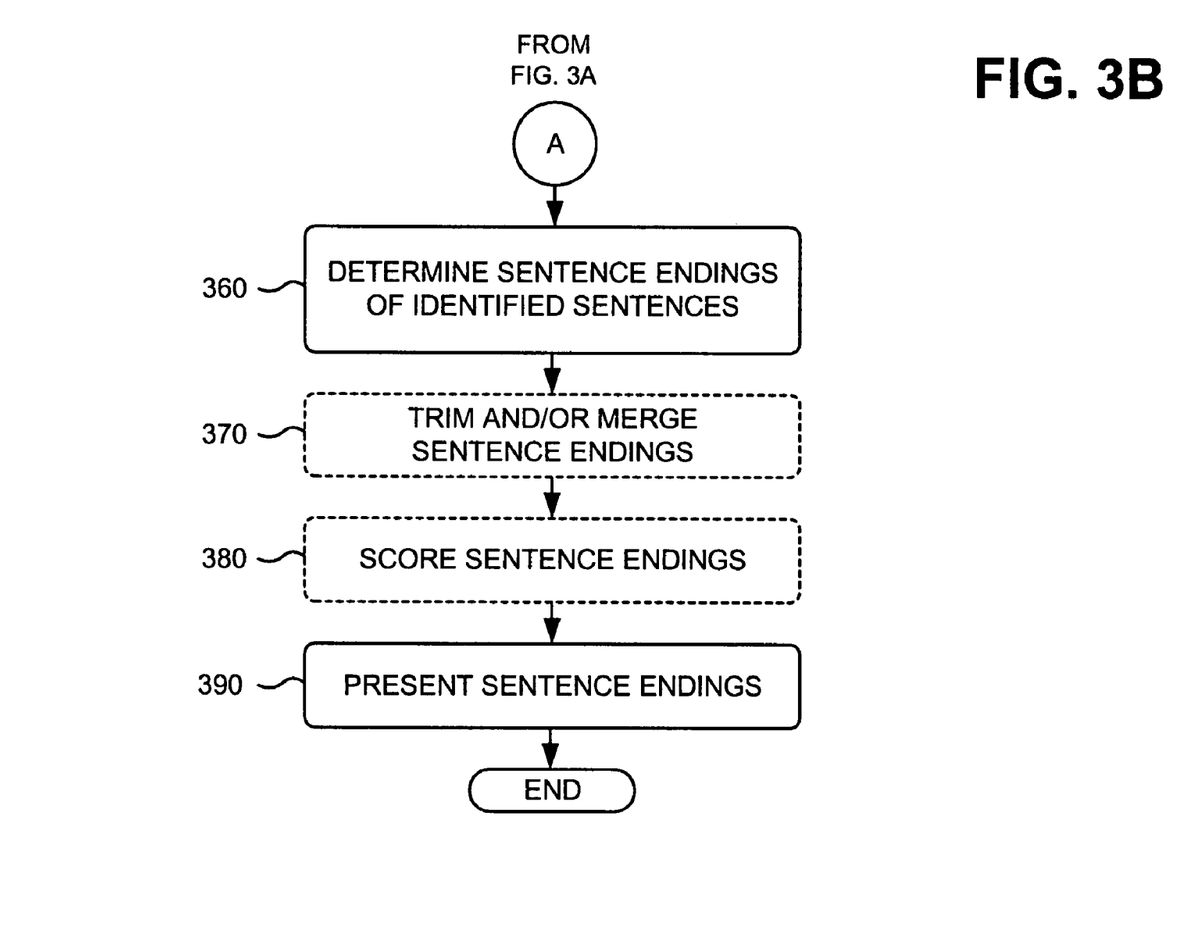

Server 120 may then determine the sentence endings (also called "completions") associated with the identified sentences (act 360) (FIG. 3B). For example, server 120 may identify the word(s) that follow the text fragment of the search query until the end of the sentence. Server 120 may define a quality sentence ending as one that "ends properly," where "ends properly" is defined as: (1) the word(s) at the end make a better end of a sentence than they do a beginning of a sentence (e.g., year and pen); and (2) the last word is not in a list of bad endings (which may be maintained by server 120) (e.g., vs, dr, and aug).

To help in determining whether a word makes a better end of a sentence than a beginning of a sentence, a set of inverse document frequency (IDF) tables may be generated. IDF refers to a measure of a word's importance. In this case, two IDF tables may be generated. One table (hereinafter referred to as "start IDF table") may include uni-grams and bi-grams that are common at the start of sentences. The other table (hereinafter referred to as "end IDF table") may include uni-grams and bi-grams that are common at the end of sentences. To determine what is "common," a corpus of documents may be analyzed to identify the text that occurs around a period. Whether a word makes a better end of a sentence may be determined by analyzing the start and end IDF tables.

Server 120 may optionally trim and/or merge the sentence endings (act 370). When determining whether to trim a sentence ending, server 120 may consider the text and symbols included in the sentence ending. For example, server 120 may compare text of the sentence ending to entries in the start and end IDF tables to determine whether to cut the text. Server 120 may also consider symbols, such as a comma, semicolon, bracket, backslash, etc., when identifying what text to cut. In one implementation, server 120 may treat the dash separately, considering the text until the dash as a substring and ignoring the text after the dash. Server 120 may also disregard entire sentence endings that contain a colon (to avoid noise from message postings). Single word sentence endings may be considered when the word is significant (e.g., it is a common ending in the end IDF table). Based on the foregoing, server 120 may further consider a sentence ending that: (1) ends properly; and (2) does not separate a preposition (or possessive) from its object.

When determining whether to merge sentence endings, server 120 may search for sentence endings that overlap (i.e., sentence endings that have one or more words in common). Sentence endings may be merged based on their common parts. When merging sentence endings, server 120 may permit some small differences between them. For example, the sentence endings "has four legs and has a tail and barks" and "has four legs and a tail" may be merged to "has four legs and a tail."

Server 120 may optionally score the sentence endings (act 380). For example, server 120 may score the sentence endings by popularity. In other words, sentence endings that occur more often in the documents retrieved by the search may be scored higher than sentence endings that do not occur as often. Server 120 may alternatively, or additionally, score the sentence endings based on where the text fragment of the search query occurs within the identified sentences. In other words, the sentence endings corresponding to sentences where the text fragment of the search query occurs at the beginning of the sentences may be scored higher than sentence endings corresponding to sentences where the text fragment occurs elsewhere within the sentences. Server 120 may also penalize sentence endings for being too long, decreasing their scores. Server 120 may separately consider all of the sentence endings that were used to create a merged sentence ending when determining the score of that sentence ending.

Server 120 may present the sentence endings to the user (act 390). If the sentence endings were scored in some manner, server 120 may organize the sentence endings into a ranked list that it may provide to the user. In one implementation, server 120 may present an initial group of sentence endings to the user. The user may then be permitted to cycle through subsequent groups in a conventional manner.

Figure 4:
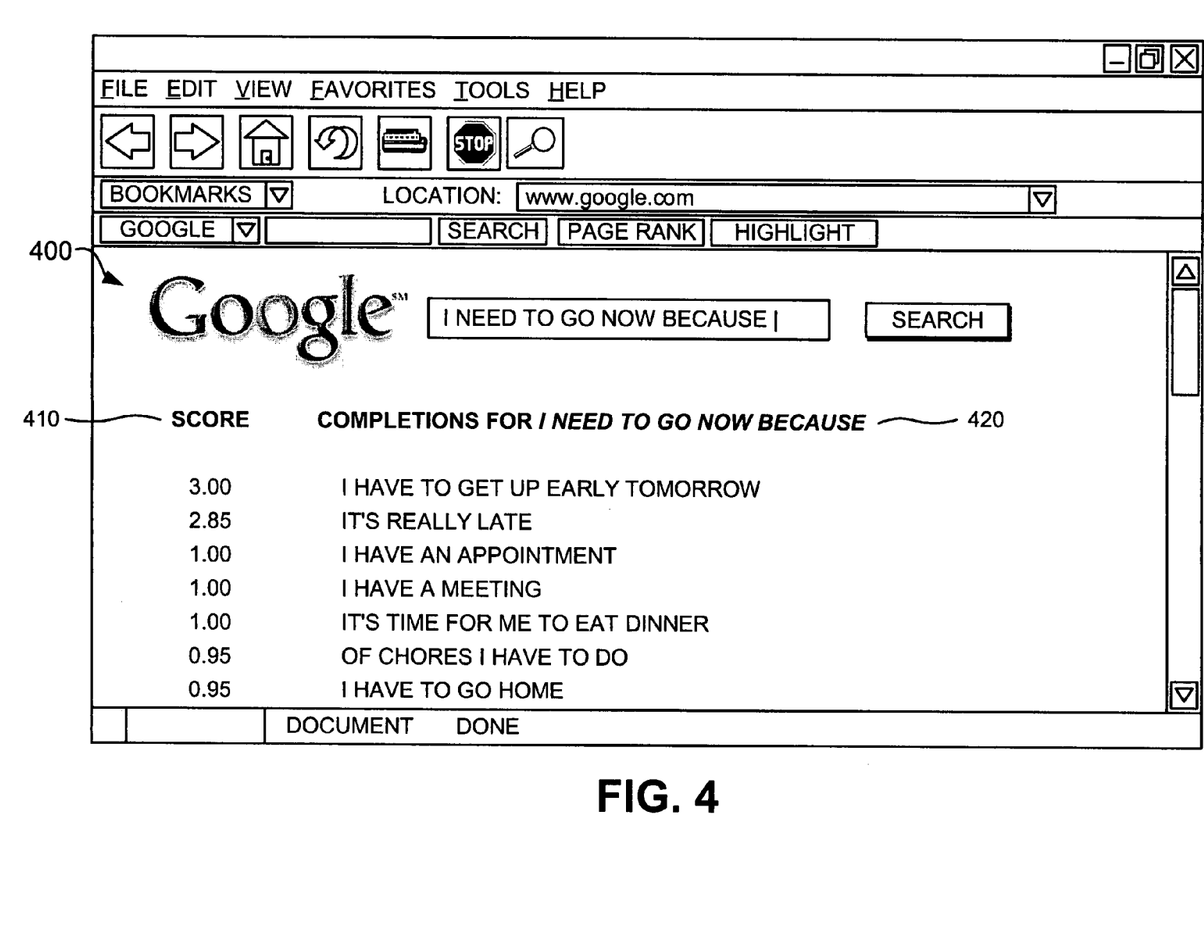
FIG. 4 is a diagram of an exemplary ranked list according to an implementation consistent with the principles of the invention.

FIG. 4 is a diagram of an exemplary ranked list 400 according to an implementation consistent with the principles of the invention. The exemplary ranked list 400 may include ranked items that each include a score 410 and a sentence ending (or "completion") 420. In this example, the user has provide a partial sentence of "I need to go now because." Server 120 provided various sentence endings that complete the partial sentence. In this example, the top-ranked sentence ending is "I have to get up early tomorrow."

In another implementation consistent with the principles of the invention, server 120 may provide sentence endings via a different interface. For example, server 120 may operate in conjunction with an application, such as a word processing application, an instant messenger application, an e-mail application, or another type of application via which documents (including messages) are prepared or edited. In any case, a server assistant, which may be in the form of executable code, such as a plug-in, an applet, a dynamic link library (DLL), or a similar type of executable object or process, resident on client 110, may operate to obtain the sentence endings from server 120. For example, the server assistant may notice text fragments that may require completion and communicate with server 120 to obtain the sentence endings. The server assistant may "notice" the text fragments by detecting them automatically to obtain the sentence endings on-the-fly or by detecting them when instructed by the user.

According to one implementation, the server assistant may automatically insert one of the sentence endings at the location of the user's cursor. For example, if the user types "I need to go because" and presses a special key, the server assistant may complete the sentence by automatically inserting one of the sentence endings. The user may then be permitted to view other possible sentence endings by pressing the special key again. Alternatively, subsequent sentence endings may be automatically presented after expiration of a possibly user-configurable amount of time. According to another implementation, the server assistant may present the sentence endings via a pop-up window, another type of interface, or a combination of interfaces (e.g., a first possible sentence ending may be automatically inserted, but subsequent sentence endings may be presented via a pop-up window).

CONCLUSION

Systems and methods consistent with the principles of the invention may automatically complete a fragment of text, such as a sentence or paragraph. The systems and methods may identify possible endings from text in web documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3A and 3B, the order of the acts may be modified in other implementations consistent with the principles of the invention. Also, non-dependent acts may be performed in parallel. Further, while the acts of trimming and merging have been described as preceding the act of scoring, the scoring act may be performed prior to the trimming and/or merging acts.

Also, automatic paragraph completion has been described briefly. In one implementation, server 120 may provide a separate interface for paragraph completion. In another implementation, server 120 may provide the same interface for sentence and paragraph completion. When searching for paragraph endings, server 120 may also look for synonyms of the words provided in the search query. Server 120 may provide paragraph endings separately from or along with sentence endings. For example, server 120 may score the paragraph endings and the sentence endings and rank them based on their scores. It may be possible for server 120 to provide paragraph endings instead of sentence endings when server 120 finds no (or very few) good sentence endings for the search query.

Further, it has generally been described that server 120 performs most, if not all, of the acts described with regard to the processing of FIGS. 3A and 3B. In another implementation consistent with the principles of the invention, one or more, or all, of the acts may be performed by client 110. For example, client 110 may obtain a text fragment and search documents local to client 110 (e.g., documents stored by client 110 and/or documents stored by a database accessible by client 110) to identify one or more documents that contain the text fragment. From these documents, client 110 may then identify potential sentence completions for the text fragment.

What is claimed is:

1. A method performed by one or more server or client devices, comprising:
    obtaining, using a processor associated with the one or more server or client devices, a text fragment;
    performing, using a processor associated with the one or more server or client devices, a search, based, at least in part, on the text fragment, to identify one or more documents;
    identifying, using a processor associated with the one or more server or client devices, sentences within the one or more documents that include the text fragment;
    determining, using a processor associated with the one or more server or client devices, sentence endings as text that is located within the identified sentences between the text fragment and an end of the identified sentences;
    assigning, using a processor associated with the one or more server or client devices, scores to the sentence endings based, at least in part, on a location within the identified sentences at which the text fragment occurs; and
    outputting, using a processor associated with the one or more server or client devices, the sentence endings as potential completions for the text fragment based, at least in part, on the scores.

2. The method of claim 1, where the text fragment includes a phrase.

3. The method of claim 1, where the obtaining a text fragment includes receiving the text fragment from a user.

4. The method of claim 1, where the obtaining a text fragment includes automatically detecting the text fragment.

5. The method of claim 1, where the performing a search includes searching for documents that include the text fragment as a phrase.

6. The method of claim 1, where the performing a search includes searching for documents that include the text fragment and synonyms of one or more words within the text fragment.

7. The method of claim 1, where the identifying sentences within the one or more documents includes determining boundaries of the identified sentences based, at least in part, on punctuation that borders the identified sentences in the one or more documents.

8. The method of claim 1, further comprising:
    trimming at least one of the sentence endings by dropping one or more words from the at least one sentence ending.

9. The method of claim 8, where the one or more words are dropped from the at least one sentence ending based, at least in part, on at least one of text or one or more symbols included in the at least one sentence ending.

10. The method of claim 9, further comprising:
    generating an inverse document frequency table that includes words common to sentence endings; and
    where the trimming at least one of the sentence endings includes:
        comparing the text of the at least one sentence ending to words in the inverse document frequency table, and
        dropping one or more words from the at least one sentence ending based, at least in part, on a result of the comparison.

11. The method of claim 9, where the trimming at least one of the sentence endings includes:
    identifying the one or more symbols included in the at least one sentence ending, and
    dropping one or more words from the at least one sentence ending based, at least in part, on the one or more identified symbols.

12. The method of claim 1, further comprising:
    merging two or more of the sentence endings into a merged sentence ending.

13. The method of claim 12, where the merging two or more of the sentence endings includes:
    identifying two or more of the sentence endings that have text in common, and
    merging the identified two or more sentence endings.

14. The method of claim 1, further comprising:
    determining quality ones of the sentence endings based, at least in part, on at least one of a table of common beginnings of sentences or a table of common endings of sentences.

15. The method of claim 1, where assigning the scores to the sentence endings is further based, at least in part, on a measure of popularity associated with each of the sentence endings.

16. The method of claim 15, where the measure of popularity associated with the sentence endings is based, at least in part, on a number of times that the sentence endings occur within the one or more documents.

17. The method of claim 1, further comprising:
    adjusting the scores of the sentence endings based, at least in part, on lengths of the sentence endings.

18. The method of claim 1, further comprising:
    adjusting the scores of the sentence endings based, at least in part, on whether at least a portion of the sentence endings are included in a list of bad endings.

19. The method of claim 1, where the outputting the sentence endings includes:

ordering the sentence endings based, at least in part, on the scores, and presenting the ordered sentence endings as potential completions for the text fragment.

20. The method of claim 1, where the outputting the sentence endings includes:

inserting one of the sentence endings near a location of the text fragment, and replacing the one of the sentence endings with a subsequent one or more of the sentence endings.

21. A system, comprising:

one or more devices comprising:

means for receiving a text fragment;

means for identifying documents that include the text fragment;

means for locating sentences within the documents that include the text fragment;

means for identifying sentence endings, associated with the located sentences, as text that is located within the located sentences between the text fragment and an end of the located sentences;

means for assigning scores to the sentence endings based, at least in part, on a measure of popularity associated with the sentence endings and a location at which the text fragment occurs within the located sentences, where the measure of popularity associated with one of the sentence endings is based, at least in part, on a number of times that the one of the sentence endings occurs within the documents; and means for presenting the sentence endings as potential completions for the text fragment based, at least in part, on the scores.

22. The system of claim 21, further comprising:

means for determining whether a quantity of the documents is less than a threshold;

means for shortening the text fragment when the quantity of the documents is less than the threshold; and means for performing a search, based, at least in part, on the shortened text fragment, to identify a set of documents.

23. The method system of claim 22, where the means for shortening the text fragment includes means for dropping one or more words from a beginning or end of the text fragment.

24. The method system of claim 22, where the means for shortening the text fragment includes:

means for identifying one or more symbols within the text fragment, and means for dropping one or more words from the text fragment based, at least in part, on the one or more identified symbols.

25. The method system of claim 22, where the means for shortening the text fragment includes:

means for analyzing a structure of the text fragment, and means for dropping one or more words from the text fragment based, at least in part, on the analysis of the structure of the text fragment.

26. A system, comprising:

one or more servers to:

receive a text fragment, where the text fragment includes a plurality of words, identify documents that include the text fragment, locate sentences within the documents that include the text fragment, determine sentence completions, associated with the located sentences, as text that is located within the located sentences between the text fragment and an end of the located sentences, trim one of the sentence completions by dropping one or more words from the one of the sentence completions, assign scores to the sentence completions based, at least in part, on a measure of popularity associated with the sentence completions and a location within the located sentences at which the text fragment occurs, and provide a plurality of the sentence completions including the trimmed sentence completion as potential completions for the text fragment based, at least in part, on the scores.

27. The system of claim 26, where the one or more servers are further to:

discard one or more of the sentence completions when at least a portion of the one or more sentence completions is included in a list of bad completions.

28. The system of claim 26, where the one or more servers include a plurality of servers.

29. A computer device, comprising:

a memory to store instructions; and a processor to execute the instructions in the memory to:

obtain a fragment of text, search for documents that include the fragment of text, identify sentences within the documents that include the fragment of text, determine sentence completions as text located within the identified sentences between the fragment of text and an end of the identified sentences, merge at least two of the sentence completions to form a single merged sentence completion, assign scores to the sentence completions based, at least in part, on a measure of popularity associated with the sentence completions and a location within the identified sentences at which the fragment of text occurs, and provide a plurality of the sentence completions, including the merged sentence completion, as potential completions for the fragment of text based, at least in part, on the scores.

30. The device of claim 29, where, when providing the plurality of sentence completions, the processor is to:

present the plurality of sentence completions via a pop-up window.

* * * * *

UNITED STATES PATENT AND TRADEMARK OFFICE
CERTIFICATE OF CORRECTION

PATENT NO. : 7,657,423 B1
APPLICATION NO. : 10/697333
DATED : February 2, 2010
INVENTOR(S) : Harik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1859 days.

Signed and Sealed this

Thirtieth Day of November, 2010

David J. Kappos
*Director of the United States Patent and Trademark Office*